(12) United States Patent
Hinoue et al.

(10) Patent No.: US 7,273,667 B2
(45) Date of Patent: Sep. 25, 2007

(54) LONGITUDINAL MULTI-LAYER MAGNETIC RECORDING MEDIUM

(75) Inventors: Tatsuya Hinoue, Kanagawa (JP); Tetsuya Kanbe, Kanagawa (JP); Hiroyuki Suzuki, Kanagawa (JP); Tomoo Yamamoto, Kanagawa (JP)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 501 days.

(21) Appl. No.: 10/856,094

(22) Filed: May 28, 2004

(65) Prior Publication Data
US 2005/0053805 A1    Mar. 10, 2005

(30) Foreign Application Priority Data
May 29, 2003    (JP)   ............................. 2003-152005

(51) Int. Cl.
*G11B 5/716*    (2006.01)
(52) U.S. Cl. .................... 428/839.3; 428/800; 428/678
(58) Field of Classification Search ................ 428/839, 428/694
See application file for complete search history.

(56) References Cited

U.S. PATENT DOCUMENTS

| | | | | |
|---|---|---|---|---|
| 4,589,042 A | * | 5/1986 | Anderson et al. ............ 360/125 |
| 5,006,395 A | * | 4/1991 | Hori et al. .................... 428/141 |
| 5,147,732 A | * | 9/1992 | Shiroishi et al. ............. 428/668 |
| 5,605,733 A | * | 2/1997 | Ishikawa et al. ............. 428/828 |
| 5,606,478 A | * | 2/1997 | Chen et al. ................... 360/126 |
| 5,650,889 A | * | 7/1997 | Yamamoto et al. ....... 360/97.01 |
| 5,713,197 A | * | 2/1998 | Ogawa et al. ................. 60/276 |
| 5,766,743 A | * | 6/1998 | Fujikata et al. .............. 428/212 |
| 5,851,643 A | * | 12/1998 | Honda et al. ................ 428/212 |
| 5,874,010 A | * | 2/1999 | Tao et al. ...................... 216/22 |
| 6,001,447 A | * | 12/1999 | Tanahashi et al. ......... 428/831.2 |
| 6,118,628 A | * | 9/2000 | Sano et al. ................... 360/126 |
| 6,221,508 B1 | * | 4/2001 | Kanbe et al. ................. 428/617 |
| 6,259,583 B1 | * | 7/2001 | Fontana et al. .............. 360/126 |
| 6,335,103 B1 | * | 1/2002 | Suzuki et al. ................ 428/611 |
| 6,338,899 B1 | * | 1/2002 | Fukuzawa et al. ...... 360/324.12 |
| 6,403,240 B1 | * | 6/2002 | Kanbe et al. ................. 428/826 |
| 6,449,122 B1 | * | 9/2002 | Yazawa et al. .............. 360/126 |
| 6,482,506 B1 | * | 11/2002 | Ejiri et al. .................... 428/212 |
| 6,490,131 B2 | * | 12/2002 | Sano et al. ................... 360/126 |
| 6,538,845 B1 | * | 3/2003 | Watanabe et al. ........... 360/126 |

(Continued)

OTHER PUBLICATIONS

Exchange Coupling in Cobalt-Tantalum-Permalloy Multilayer Films, (L.A. Pearey et al., IEEE Transactions on Magnetics, vol. Mag-23, No. 5, Sep. 1987).*

(Continued)

*Primary Examiner*—Carol Chaney
*Assistant Examiner*—Gary D. Harris
(74) *Attorney, Agent, or Firm*—Bracewell & Giuliani LLP

(57) ABSTRACT

A magnetic recording medium capable of attaining high in-plane recording density of 100 Mbits or more per 1 $mm^2$ is provided. Magnetic recording medium is provided in which underlayers, a first magnetic layer, a first intermediate layer, a second magnetic layer, a second intermediate layer, a third magnetic layer, a protection layer and lubrication layer are formed in this order above a substrate. Each of the third magnetic layer and the second magnetic layer comprises a Co-based alloy containing at least Pt, Cr and B. The concentration of Pt contained in the second magnetic layer is not more than that in the third magnetic layer.

15 Claims, 1 Drawing Sheet

U.S. PATENT DOCUMENTS

| | | | |
|---|---|---|---|
| 6,589,669 B2* | 7/2003 | Uwazumi et al. | 428/832.2 |
| 6,596,420 B2* | 7/2003 | Kanbe et al. | 428/832.2 |
| 6,641,935 B1* | 11/2003 | Li et al. | 428/828.1 |
| 6,680,831 B2* | 1/2004 | Hiramoto et al. | 360/324.11 |
| 6,764,778 B2* | 7/2004 | Saito et al. | 428/811.2 |
| 6,773,556 B1* | 8/2004 | Brockie et al. | 204/192.2 |
| 6,777,066 B1* | 8/2004 | Chang et al. | 428/828 |
| 6,778,358 B1* | 8/2004 | Jiang et al. | 360/126 |
| 6,815,082 B2* | 11/2004 | Girt | 428/828.1 |
| 6,835,475 B2* | 12/2004 | Carey et al. | 428/828.1 |
| 6,943,041 B2* | 9/2005 | Sugita et al. | 438/3 |
| 7,008,702 B2* | 3/2006 | Fukuzawa et al. | 428/811.2 |
| 7,050,253 B2* | 5/2006 | Kanbe et al. | 360/55 |
| 7,056,604 B2* | 6/2006 | Kanbe et al. | 428/832 |
| 2001/0023032 A1* | 9/2001 | Uwazumi et al. | 428/694 TS |
| 2002/0058161 A1* | 5/2002 | Yamamoto et al. | 428/694 TS |
| 2002/0150796 A1* | 10/2002 | Kanbe et al. | 428/694 TS |
| 2003/0096127 A1* | 5/2003 | Hikosaka et al. | 428/480 |
| 2003/0134151 A1* | 7/2003 | Usuki et al. | 428/693 |
| 2003/0211364 A1* | 11/2003 | Kanbe et al. | 428/694 TS |
| 2003/0218834 A1* | 11/2003 | Kanbe et al. | 360/313 |
| 2005/0053805 A1* | 3/2005 | Hinoue et al. | 428/694 TM |
| 2006/0098357 A1* | 5/2006 | Hasegawa et al. | 360/324.11 |

OTHER PUBLICATIONS

Exchange Coupling in Cobalt-Tantalum-Permalloy Multilayer Films, L.A. Pearey et al., IEEE Transactions on Magnetics, vol. Mag-23, No. 5, Sep. 1987.*

* cited by examiner

LONGITUDINAL MULTI-LAYER MAGNETIC RECORDING MEDIUM

RELATED PATENT APPLICATION

This application claims priority to Japanese Patent Application No. 2003-152005 (Hitachi Global Storage Technologies Docket No. HJP9-2003-0005), filed on May 29, 2003.

BACKGROUND OF THE INVENTION

1. Technical Field

The present invention relates to magnetic recording media capable of recording large capacity of information and, more particularly, it relates to a magnetic recording medium suitable to high-density magnetic recording.

2. Description of the Related Art

A demand for increasing the capacity in magnetic storage apparatus typically represented by a magnetic disk drive has been increased more and more. In order to cope with the demand, magnetic heads at high sensitivity or recording media capable of obtaining high signal output-to-noise ratio: S/Nd have been desired.

Generally, a recording medium comprises a first underlayer referred to as a seed layer, a second underlayer of a body-centered cubic structure comprising a chromium alloy, a magnetic layer, and a protection film comprising carbon as a main ingredient, which are formed on a substrate. For the magnetic layer an alloy having a hexagonal close-pack structure comprising cobalt as a main ingredient is used.

To improve S/Nd, it is effective to provide a magnetic layer with crystallographic orientation in which (11.0) face, or (10.0) face are substantially in parallel with the surface of a substrate and direct the c-axis of the hexagonal close-pack structure as an axis of easy magnetization within the film plane. It has been known that the crystallographic orientation of the magnetic layer can be controlled by a seed layer and the orientation can be attained by using tantalum or B2 structure NiAl alloy for the seed layer. It has also been known that magnetic characteristics in the circumferential direction can be improved by applying mechanical texturing to the surface of a substrate to introduce magnetic anisotropy in the circumferential direction.

To improve S/Nd, it is effective to adopt a multi-layered constitution for the magnetic layer, refine the crystal grain size and reduce Brt as a product of a residual magnetic flux density (Br) and a film thickness (t) of the magnetic layer. That is, a magnetic recording medium has been proposed in which an underlayer is formed on a substrate, and stacked magnetic films constituted with magnetic layers comprising two layers of different compositions in contact with each other are disposed thereon as a multi-layered constitution by way of a non-magnetic layer such as made of ruthenium.

In addition, another magnetic recording medium including an underlayer and a magnetic recording layer formed thereover on a substrate has been proposed in which the magnetic recording layer has a multi-layered structure separated vertically by an intermediate layer, the intermediate layer is formed of one of materials selected from the group consisting of Ru, Rh, Ir and an alloy thereof selected from a range of 0.2 nm to 0.4 nm and 1.0 nm to 17 nm and directions of magnetization for the magnetic recording layers separated vertically by the intermediate layer are in parallel with each other. The use of such a magnetic recording medium having a magnetic recording layer of a multi-layered structure achieves thermal stability and reduced noise together with maintenance of magnetic characteristics.

When crystal particles used for the magnetic recording layer are refined extremely, or Brt, is reduced greatly, thermal stability is deteriorated and, accordingly, there is a limit for the reduction of noise. In recent years, an anti-ferromagnetic coupled (AFC) medium to be described later has been proposed as a technique of making the thermal stability and the noise reduction compatible with each other. This medium has a dual-layered structure in which two magnetic layers are anti-ferromagnetically coupled by way of an Ru intermediate layer, which can reduce Brt more while keeping the magnetic film thickness compared with a medium comprising a single-layered magnetic layer. This enables reduced medium noise together with maintenance of the thermal stability.

U.S. Patent Application Publication No. 2002/98390A1, proposes a magnetic recording medium having a substrate and a magnetic recording layer on the substrate, in which the magnetic recording layer comprises an the AFC layer, a ferromagnetic layer and a non-magnetic spacer layer for separating the AFC layer and the ferromagnetic layer, the AFC layer comprises a first ferromagnetic layer, a second ferromagnetic layer, and a layer present between the first and the second ferromagnetic layer for anti-ferromagnetically coupling them, the anti-ferromagnetically coupling layer of the AFC layer has a film thickness and a composition for providing anti-ferromagnetic exchange coupling between the first and the second ferromagnetic layer, and the non-ferromagnetic spacer formed between the second magnetic layer of the AFC layer and the ferromagnetic layer has a film thickness and a composition providing no exchange coupling between the second magnetic layer of the AFC layer and the ferromagnetic layer.

SUMMARY OF THE INVENTION

However, the techniques described above, even when combined, are still insufficient to attain a plane recording density of 100 Mbit or more per 1 mm$^2$ and it is necessary to further improve the reading output and improve the S/Nd.

It is an object of the present invention to provide a longitudinal magnetic recording medium having a high medium S/N, excellent overwriting characteristics and stability sufficient for thermal fluctuation.

The problem to be solved by the present invention can be attained by a magnetic recording medium comprising the following constitution. That is, in a magnetic recording medium in which an underlayer, a first magnetic layer, a first intermediate layer, a second magnetic layer, a second intermediate layer, a third magnetic layer, a protection layer, and a lubrication layer, which are formed in this order above a substrate, each of the third magnetic layer and the second magnetic layer comprises a cobalt (Co)-based alloy containing at least platinum (Pt), chromium (Cr), and boron (B), and a concentration of platinum contained in the second magnetic layer is not more than that in the third magnetic layer. Further, platinum contained in the third magnetic layer is 15 at % or less, a concentration of chromium contained in the third magnetic layer is 15 at % or more and 18 at % or less, and a concentration of boron contained in the third magnetic layer is 7 at % or more and 10 at % or less.

The first intermediate layer preferably comprises ruthenium (Ru) as a main ingredient. Further, the second intermediate layer preferably comprises ruthenium as a main ingredient and the thickness is preferably from 0.6 nm to 1 nm.

The underlayer comprises a nickel (Ni) alloy layer containing tantalum (Ta), a layer comprising Ta as a main ingredient and a chromium (Cr) alloy layer containing titanium (Ti) and boron (B) in this order.

The first intermediate layer formed between the first magnetic layer and the second magnetic layer preferably comprises Ru as a main ingredient and has a thickness from 0.5 nm to 0.8 nm. This makes the first magnetic layer and the second magnetic layer tend to be easily coupled anti-ferromagnetically, suppressing occurrence of thermal fluctuation. The first magnetic layer and the first intermediate layer are formed preferably since a large coercive force can be obtained easily for relatively small Brt even when the thickness of the second magnetic layer is increased, compared with a case of not forming the first magnetic layer and the first intermediate layer.

In a case of providing a layer of 1.5 nm or less of thickness comprising Ru as a main ingredient by using a sputter target containing Ru and inevitable constituent elements, the layer sometimes contains constituent elements of upper and lower layers even without using an Ru alloy target positively containing Co for forming the first intermediate layer. For the first intermediate layer, at least one element selected from the group consisting of Ru, iridium (Ir) and rhodium (Rh) or an alloy comprising the element described above as a main ingredient can be used for the first intermediate layer.

It is preferred that the first magnetic layer be thin to such an extent as enabling anti-ferromagnetic coupling. The film thickness also depends on the composition of the magnetic layer.

It is preferred that also the second intermediate layer formed between the second magnetic layer and the third magnetic layer comprise Ru as a main ingredient and have a thickness from 0.6 nm to 1.0 nm. Also in a case of forming the second intermediate layer by sputtering a target containing Ru and inevitable constituent elements, the layer may sometimes contain constituent elements of the upper and lower layers. In a case where the thickness of the second intermediate layer is reduced to less than 0.5 nm, this increases medium noise attributable to the increased exchange coupling and decreased S/Nd. Further, when the thickness of the second intermediate layer is reduced to less than 0.6 nm, thermal demagnetization occurs at 65° C. On the other hand, in a case of forming the second intermediate layer to a thickness from 0.6 nm to 1 nm, the thermal demagnetization at 65° C. is within an allowable range. When the thickness of the second intermediate layer is increased from 0.8 nm to 1 nm, overwriting characteristics are slightly lowered and S/Nd is neither improved. Accordingly, it is preferred that also the second intermediate layer comprise Ru as a main ingredient and have a thickness within a range from 0.6 nm to 1.0 nm, more preferably, from 0.6 nm to 0.8 nm.

Each of the third magnetic layer and the second magnetic layer comprises a Co-based alloy containing at least Pt, Cr and B, because Pt is essential for improving the coercive force, and Cr and B are essential for reducing medium noise. In particular, the additive element B provides an effect of refining crystal particles and reducing medium noise.

The Pt concentration contained in the second magnetic layer is not more than the concentration of Pt contained in the third magnetic layer. This intends to ensure the overwriting characteristics. In a case where the concentration of Pt contained in the second magnetic layer is more than the concentration of Pt contained in the third magnetic layer, it is not preferred since the overwriting characteristics are deteriorated.

Pt contained in the third magnetic layer is 15 at % or less, because higher Pt concentration tends to deteriorate the overwriting characteristics.

The concentration of Cr contained in the third magnetic layer in a rage from 15 at % or more and 18 at % or less is determined as within a range where the reduction of the medium noise, that is, high S/Nd and the overwriting characteristics are compatible with each other.

In a case where the concentration of Cr contained in the third magnetic layer lowers to less than 15 at %, since medium noise increases, an S/Nd ratio is lowered. On the other hand, when the concentration of Cr contained in the third magnetic layer exceeds 18 at %, the thickness of the magnetic layer becomes excessively large enough to satisfy thermal fluctuation and, as a result, the overwriting characteristics are deteriorated and the medium noise is increased.

It is necessary that the concentration of B contained in the third magnetic layer is 7 at % or more, because refinement of the crystal grain size in the magnetic film is essential for attaining a high S/Nd. The concentration of B contained in the third magnetic layer is 10 at % or less is necessary for target workability. When an alloy containing B at a high concentration exceeding 10 at % is intended for target fabrication after vacuum melted, cracking is liable to occur, making target fabrication difficult.

When the concentration of Pt contained in the second magnetic layer is less than that in the third magnetic layer and the concentration of Cr contains in the second magnetic layer is more than that in the third magnetic layer, overwriting characteristics are improved and S/Nd is improved.

It is preferred that the first magnetic layer be a Co-based alloy containing Cr or a Co-based alloy containing Cr and Pt, since a thin film magnetically, oriented in-plane tends to be formed easily on the underlayer.

Since similar effect can also be obtained by using a material of an amorphous structure for the underlayer instead of forming an Ni alloy layer containing Ta, a layer comprising Ta as a main ingredient or a Cr alloy layer containing Ti and B on a substrate, there is no particular restriction also for other alloy materials than the Ni alloy containing Ta. Alloy of an amorphous structure is determined when an X-ray diffraction curve obtaining by using Cu characteristic X-rays exhibits no distinct diffraction peak other than a hallow pattern, or the average grain size obtained from lattice images taken under a high resolution electron microscope is 5 nm or less. When a layer comprising Ta as a main ingredient is formed on the amorphous alloy layer, (100) orientation can be introduced to an underlayer comprising an alloy of a body-centered cubic structure containing Cr as a main ingredient. To provide intense (100) orientation in the Cr alloy underlayer, it is preferred that the thickness of the layer comprising Ta as the main ingredient be within a range from 1 to 10 nm. Further, (100) orientation of the Cr alloy underlayer can be improved also by artificially oxidizing the surface of the layer comprising Ta as the main ingredient in an oxygen atmosphere or a mixed gas atmosphere in which oxygen is added to Ar after forming the layer comprising Ta as the main ingredient.

Since the crystal particles of the magnetic layer formed on the Cr alloy layer containing Ti and B are refined to reduce medium noise, this is preferred for solving the problem described above. Instead of the Cr alloy, it is also possible to use a Cr alloy containing at least one element selected from Ti, molybdenum (Mo), and tungsten (W), or an alloy having a body-centered cubic structure comprising Cr as a main ingredient. Further, a multi-layered structure comprising the alloy layer such as (Cr—Mo)/(Cr—Ti) may also be adopted.

The magnetic layer may also be formed by making the composition of alloy targets for forming the second magnetic layer identical to that for the third magnetic layer.

The foregoing object can be attained also by utilizing a substrate whose surface subjected to texturing and forming a magnetic layer and a protection layer by way of an underlayer above the substrate. The substrate usable herein can include a glass substrate, a magnesium-containing aluminum (Al—Mg) alloy substrate formed by coating a nickel phosphorus (Ni—P) plating film, and a ceramic substrate. When a substrate whose surface formed with concentric grooves thereon by texturing is used, since Brt measured in the circumferential direction is larger than Brt measured in the radial direction, the thickness of the magnetic layer can be reduced to improve the output resolution. While the texturing may be applied after forming the underlayer, it is preferred to apply the texturing directly to the substrate surface and then form continuous thin film after cleaning and drying.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
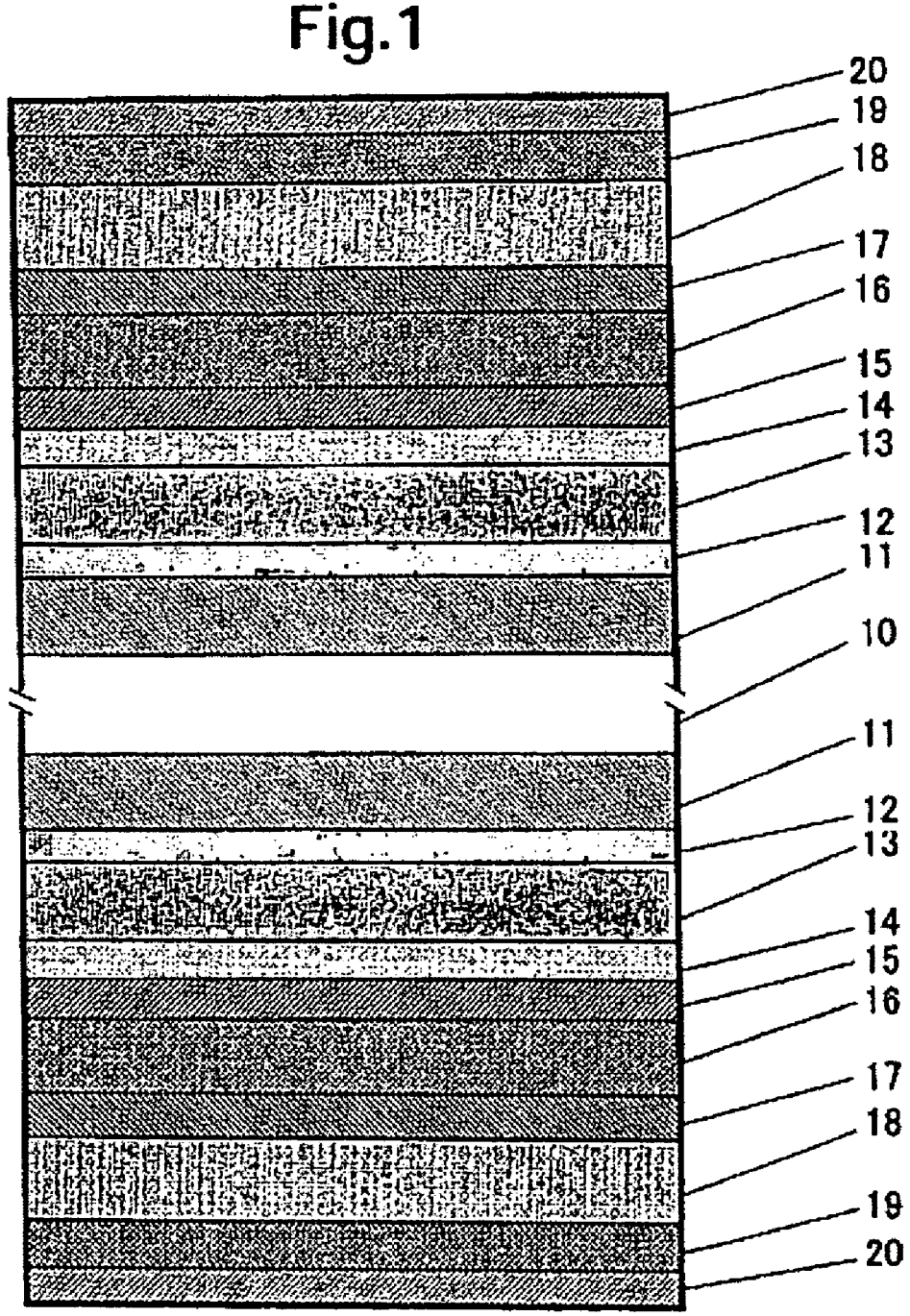
FIG. 1 is a cross sectional view showing one embodiment of a magnetic recording medium constructed in accordance with the present invention.

Examples of the present invention will be described in detail with reference to the appended drawings.

EXAMPLE 1

FIG. 1 shows a cross-sectional structure for one embodiment of a magnetic recording medium according to the invention. After alkali-cleaning and drying an alumino silicate glass substrate 10 chemically strengthened on the surface, an argon (Ar) gas was introduced in a vacuum, an Ni-35 at % Ta alloy film of 30 nm thickness formed by adding 35 at % tantalum to nickel as a first underlayer 11 and a layer of 2 nm thickness comprising Ta as a main ingredient as a second underlayer 12 were formed at room temperature by a sputtering method. Then, after heating by lamp heaters such that the temperature of the substrate was at about 300° C. in a vacuum, a Cr-15 at % Ti-5% B alloy layer of 10 nm thickness as a third underlayer 13 was formed. Further, a first magnetic layer 14 of 3 nm thickness comprising a Co-14 at % Cr-6 at % Pt alloy, a first intermediate layer 15 of 0.6 nm thickness comprising Ru, a second magnetic layer 16 comprising cobalt (Co) as a main ingredient, a second intermediate layer 17 of 0.6 nm thickness comprising Ru and a third magnetic layer comprising Co as a main ingredient were formed successively, and then a carbon film 19 of 3.2 nm thickness was formed as a protection layer.

After forming the carbon film, a lubricant comprising a perfluoro alkyl polyether as a main ingredient was coated to form a lubrication layer 20 of 18 nm thickness. The multi-layered film was formed by using a sheet type sputtering apparatus (MDP250B) manufactured by Intevac Corp. The base vacuum degree of this apparatus was 1.0 to $1.2 \times 10^{-4}$ Pa and the tact time was 7 sec in the sputtering apparatus. Layers from the first underlayer to the upper magnetic layer were formed in an Ar gas atmosphere at 0.93 Pa, and the carbon protection film was formed in a mixed gas atmosphere comprising Ar with addition of 10% nitrogen.

For the second magnetic layer 16 comprising Co as the main ingredient and the third magnetic layer 18 comprising Co as the main ingredient, a Co-16 at % Cr-14 at % Pt-8 at % B alloy target was used.

Magnetic recording media were formed with varied film thickness while making the composition for the target forming the second magnetic layer 16 identical to that of the third magnetic layer 18. Further, a lubrication layer 20 comprising the perfluoro polyether was formed.

The magnetic recording media were evaluated for electromagnetic conversion characteristics in a spin stand being combined with a composite head having a recording electromagnetic induction type magnetic head and a reproducing spin valve type magnetic head together. In the head used for evaluation, a writing gap length was 110 nm, an inter-shield gap length was 70 mm and a geometrical reading track width was 230 nm. Signals at 135 kFCI (5.31 K flux change per 1 mm) as 1 F signals for low recording density and signals at 810 kFCI (31.9 flux change per 1 mm) as 2 F signals for high recording density were overwritten, and overwriting characteristics O/Wn'n were determined based on the attenuation ratio of 1 F signals.

In a case of using the magnetic alloy target and making the composition for the second magnetic layer identical to that for the third magnetic layer, and making the film thickness equal between the second magnetic layer and the third magnetic layer, O/Wn'n decreased monotonously with increase of Brt substantially on one identical curve irrespective of the composition, within a range of Brt of the stacked films from 4 Tnm to 10 Tnm. The Brt and O/Wn'n have a relation: O/Wn'n=−35 dB, at Brt=6 Tnm, and O/Wn'n=−27 dB at Brt=10 Tnm.

In a case of making the compositions identical between the second magnetic layer and the third magnetic layer and making the film thickness equal between them, lowering of output due to thermal fluctuation was decreased along with increase in Brt. When the value of Brt measured in the medium described in this example was 8 Tnm or more, the output reduction rate was from about −1.4%/digit to −1.5%/digit, obtaining a result that it was sufficiently stable to the thermal fluctuation and caused no problem in view of reliability. Thermal demagnetization at 65° C. was evaluated by leaving the medium for 1 sec to 1000 sec after recording and based on the attenuation rate of the reading output.

Targets of the three compositions described above were formed directly on glass substrates and compositions were analyzed based on plasma emission spectrometry (ICPS). As a result, target composition and the thin film composition were almost identical.

In a case where a specimen in which only the first underlayer was formed, while the second underlayer and the succeeding layers were not formed was analyzed by an X-ray diffraction curve using copper characteristic X-rays, no distinct diffraction peaks other than the hallow pattern were exhibited. Further, as a result of measuring the X-ray diffraction curve for the specimen formed up to the protection film no distinct diffraction peaks were exhibited, other than the 200 diffraction peak attributable to the third underlayer having a body-centered cubic structure and the 110 diffraction peak attributable to the second magnetic layer and the third magnetic layer having the hexagonal densepack structure.

COMPARATIVE EXAMPLE 1

A magnetic recording medium was formed in the same manner as in the magnetic recording medium described in Example 1 except for not forming the second intermediate layer 17 of 0.6 nm thickness comprising Ru and the third magnetic layer 18 comprising Co as the main ingredient. After alkali-cleaning and drying an alumino silicate glass substrate 10 chemically strengthened on the surface, an argon (Ar) gas was introduced in a vacuum, an Ni-35 at % Ta alloy film of 30 nm thickness formed by adding 35 at % tantalum to nickel as a first underlayer 11 and a layer of 2 nm thickness comprising Ta as a main ingredient as a second underlayer 12 were formed at room temperature by a sputtering method. Then, after heating by lamp heaters such that the temperature of the substrate was at about 300° C. in a vacuum, a Cr-15 at % Ti-5% B alloy of 10 nm thickness as a third underlayer 13 was formed. Further, a first magnetic layer 14 of 3 nm thickness comprising a Co-14 at % Cr-6 at % Pt alloy, a first intermediate layer 15 of 0.6 nm thickness comprising Ru, and a second magnetic layer 16 using a Co-16 at % Cr-14 at % Pt-8 at % B alloy target were formed successively, and then a carbon film 19 of 3.2 nm thickness was formed as a protection layer.

In the medium having the constitution of Comparative Example 1, as the Brt was lowered, S/Nd was improved and, at the same time, an output reduction rate at 65° C. was increased. The lower limit for Brt where the output reduction rate at 65° C. was −1.5%/digit was 4 Tnm. As a result of comparison with S/Nd of a medium of Example 1 at Brt=8 Tnm capable of providing the identical output reduction rate with that of the medium, the S/Nd of the medium described in Example 1 was improved by about 1 dB compared with the S/Nd of the medium of Comparative Example 1.

Further, the S/Nd of the medium of Example 1 was improved by 2.2 dB compared with S/Nd of the medium of Comparative Example 1 where Brt=8 Tnm.

From the results described above, it has been found that the medium having the constitution described in Example 1 was sufficiently stable to thermal fluctuation and resulted in no problem in view of reliability, had no problem in view of the overwriting characteristics and could improve S/Nd, compared with the dual layered AFC medium described in Comparative Example 1.

EXAMPLE 2

In the same manner as in Example 1, the following alloy targets were prepared by setting the content for Pt and B constant and varying the ratio of Co to Cr as the material for use in the second magnetic layer 16 comprising Co as the main ingredient and for use in the third magnetic layer 13 comprising Co as the main ingredient.

CO-13 at. % Cr-14 at. % Pt-8 at. %

CO-14 at. % Cr-14 at. % Pt-8 at. %

CO-15 at. % Cr-14 at. % Pt-8 at. %

CO-16 at. % Cr-14 at. % Pt-8 at. %

CO-17 at. % Cr-14 at. % Pt-8 at. %

CO-18 at. % Cr-14 at. % Pt-8 at. %

CO-19 at. % Cr-14 at. % Pt-8 at. %

Magnetic recording media were formed while making the thickness identical between the second magnetic layer and the third magnetic layer such that Brt=8 Tnm and using targets of 7 compositions. Table 1 shows the result of the evaluation of overwriting characteristics (O/W), S/Nd, and output reduction ratio at 65° C.

TABLE 1

| Specimen No | Composition for second and third magnetic layers | O/W (dB) | S/Nd (dB) | Output reduction rate |
|---|---|---|---|---|
| 101 | Co-13at. % Cr-14at. % Pt-8at. % B | −28 | 22.3 | −1.7% digit |
| 102 | Co-14at. % Cr-14at. % Pt-8at. % B | −29 | 23.1 | −1.5% digit |
| 103 | Co-15at. % Cr-14at. % Pt-8at. % B | −31 | 23.9 | −1.3% digit |
| 104 | Co-16at. % Cr-14at. % Pt-8at. % B | −31 | 24.6 | −1.4% digit |
| 105 | Co-17at. % Cr-14at. % Pt-8at. % B | −31 | 24.2 | −1.3% digit |
| 106 | Co-18at. % Cr-14at. % Pt-8at. % B | −30 | 23.6 | −1.4% digit |
| 107 | Co-19at. % Cr-14at. % Pt-8at. % B | −27 | 22.8 | −1.6% digit |

As shown in Table 1, overwriting characteristics (O/W) of −30 dB or less were obtained within a range of Cr composition of 15 at % to 18 at % for the third magnetic layer and the second magnetic layer. The output reduction ratio was also about −1.3 to −1.4%/digit, they were sufficiently stable against thermal fluctuation to obtain a result that there is no problem in view of reliability. S/Nd was maximum in a case where Cr composition was 16 at % for the third magnetic layer and the second magnetic layer.

Compositional analysis was conducted by plasma emission spectrometry (ICPS) for the compositions of targets used for forming the third magnetic layer and the second magnetic layer and film formed from the magnetic layers each formed as a single layer on a glass substrate. As a result, compositions were substantially identical between the target composition and the thin film composition.

EXAMPLE 3

Magnetic recording media were formed in the same manner as in Example 1 except for changing the composition of the magnetic layer. The compositions for the alloy targets forming the second magnetic layer and the third magnetic layer were defined as the following five compositions. The Cr addition concentration was set to 15 at %, the B addition concentration was set to 8 at % and comparison was made by replacing Pt with Co.

Co-15 at. % Cr-12 at. % Pt-8 at. % B

Co-15 at. % Cr-13 at. % Pt-8 at. % B

Co-15 at. % Cr-14 at. % Pt-8 at. % B

Co-15 at. % Cr-15 at. % Pt-8 at. % B

Co-15 at. % Cr-16 at. % Pt-8 at. % B

Magnetic recording media were prepared in the same manner as in Example 1 while making the composition of alloy targets for forming the second magnetic layer and the third magnetic layer identical, and setting the thickness between the second magnetic layer and the third magnetic layer identical. Table 2 shows the result of evaluation for the media.

TABLE 2

| Specimen No. | Composition for second and third magnetic layers | Brt (Tnm) | O/W (dB) | S/Nd (dB) | Output reduction rate |
|---|---|---|---|---|---|
| 201 | Co-15at. % Cr-12at. % Pt-8at. % B | 7.8 | −34 | 24.3 | −2.1% digit |
| 202 | Co-15at. % Cr-12at. % Pt-8at. % B | 10 | −24 | 22.4 | −1.5% digit |
| 203 | Co-15at. % Cr-13at. % Pt-8at. % B | 8.8 | −28 | 23.3 | −1.4% digit |
| 103 | Co-15at. % Cr-14at. % Pt-8at. % B | 8.2 | −31 | 23.9 | −1.3% digit |
| 204 | Co-15at. % Cr-15at. % Pt-8at. % B | 7.9 | −26 | 23.4 | −1.3% digit |
| 205 | Co-15at. % Cr-16at. % Pt-8at. % B | 8.1 | −23 | 22.1 | −1.1% digit |

For the magnetic recording media of specimen Nos. 201 and 202, a Co-15 at % Cr-12 at % Pt-8 at % B alloy target was used when forming the second magnetic layer and the third magnetic layer. In the magnetic recording medium of specimen No. 201, the output reduction rate measured at 65° C. was −2.1% per time digit to result in a problem for the thermal demagnetization characteristics. On the other hand, in the specimen No. 202 in which the thickness was increased for the second magnetic layer and the third magnetic layer and Brt was 10 Tnm, the output reduction rate at 65° C. was about −15% per time digit showing no problem with the thermal demagnetization characteristics. However, the overwriting characteristics (O/W) of the medium was small as −24 dB.

On the other hand, the output reduction rate measured at 65° C. for the magnetic recording medium 205 formed by using a Co-15 at % Cr-16 at % Pt-8 at % B alloy target was about −1.1% per time digit showing no problem with the thermal demagnetization characteristics. However, the overwriting characteristics (O/W) of the magnetic recording medium was degraded as −23 dB.

In the magnetic recording media 203, 103 and 201 formed by using an alloy target setting the Cr concentration to 15 at %, B concentration to 8 at % and Pt concentration to 13 to 15 at %, the overwriting characteristics (O/W) could also be improved than −26 dB at Brt=7.9 Tnm to 8.8 Tnm, and the output reduction rate at 65° C. was −1.3 to 1.4%/digit showing no problem with thermal demagnetization characteristics.

From the results, described above, it was found that magnetic recording media capable of decreasing the output reduction rate and, at the same time, being compatible between the overwriting characteristics and high S/Nd can be attained in a case of controlling the addition concentration of Pt in the Co—Cr—Pt—B alloy from 13 at % to 15 at %.

EXAMPLE 4

Magnetic recording media were formed so as to provide Brt=8 Tnm in the same manner as in Example 1 except for changing the composition for the second magnetic layer and the third magnetic layer. The composition for the alloy targets constituting the second magnetic layer and the third magnetic layer were defined as the following four compositions.

Co-16 at. % Cr-14 at. % Pt-6 at. % B

Co-16 at. % Cr-14 at. % Pt-7 at. % B

Co-16 at. % Cr-14 at. % Pt-8 at. % B

Co-16 at. % Cr-14 at. % Pt-10 at. % B

In addition to the alloy targets described above, it was also intended to provide a Co-16 at % Cr-14 at % Pt-11 at % B alloy target. However, in the alloy containing 11 at % B, the target tended to be cracked upon fabrication and the yield of the target was poor.

When the overwriting characteristics (O/W) were evaluated for the magnetic recording media formed by using the alloy targets of the four compositions using the magnetic head described in Example 1, characteristics improved than −27 dB were obtained in each of the magnetic recording media.

Table 3 shows the result of measurement for the magnetic recording media. The output reduction rate was within −1.5%/digit for each of media except for the specimen No. 303. In the magnetic recording medium of No. 303 formed by using the Co-16 at % Cr-14 at % Pt-10 at % B alloy target, the output reduction rate increased to about −2.2%/digit. In order to decrease the output reduction to −1.5%/digit for the medium formed by using the alloy target, Brt had to be increased up to Brt=9 Tnm.

TABLE 3

| Specimen No. | Composition for second and third magnetic layers | Brt (Tnm) | <D> (nm) | O/W (dB) | S/Nd (dB) | Output reduction rate |
|---|---|---|---|---|---|---|
| 301 | Co-16at. % Cr-14at. % Pt-6at. % B | 8.1 | 9.0 | −27 | 23.2 | −1.1% digit |
| 302 | Co-16at. % Cr-14at. % Pt-7at. % B | 7.9 | 8.7 | −29 | 23.8 | −1.3% digit |
| 104 | Co-16at. % Cr-14at. % Pt-8at. % B | 7.8 | 8.5 | −31 | 24.6 | −1.4% digit |
| 303 | Co-16at. % Cr-14at. % Pt-10at. % B | 8.0 | 8.1 | −33 | 25.3 | −2.2% digit |
| 304 | Co-16at. % Cr-14at. % Pt-10at. % B | 9.0 | 8.2 | −28 | 24.3 | −1.5% digit |

Table 3 shows the result of plane observation for the average crystal grain size <D> of the magnetic layer under a transmission type electron microscope. When Co was substituted with B from 7 at % to 10 at %, the average crystal grain size <D> was decreased from 8.7 nm to 8.1 nm and it was found that the grain size could be decreased to less then 9 nm. S/Nd was improved in accordance with the refinement of the crystal grain size in the magnetic layer.

In view of the result of study, it was found that the addition concentration of B is preferably 7 at % or more and 10 at % or less in order to decrease the average crystal grain size <D> to less than 9 nm and, at the same time, to reduce the thermal fluctuation.

EXAMPLE 5

Magnetic recording media were formed as in Example 1 except for changing the film thickness of Ru of 0.6 nm with 0 nm, 0.3 nm, 0.4 nm, 0.5 nm, 0.8 nm, and 1.0 nm. The thickness for the second magnetic layer 16 and the third magnetic layer 18 were set to such film thickness that Brt=7.8 Tnm in a case of using Ru of 0.6 nm thickness as the second intermediate layer 17.

As a result of measuring the electromagnetic conversion characteristics of the magnetic recording media, as shown in Table 4, S/Nd showed the maximum value in the magnetic recording medium of specimen No. 404 where the second intermediate layer was 0.5 nm. The overwriting characteristics were lowered slightly as the thickness of the second intermediate layer 17 was increased.

From the result of the measurement for the thermal demagnetization at 65° C., an output reduction of −2.4% to −2.2% per time digit was observed in the magnetic recording media of specimens Nos. 403, 404 where the thickness of the second intermediate layer 17 was 0.4 nm and 0.5 nm. On the other hand, the output reduction rate at 65° C. could be decreased to about '1.5% per time digit when the thickness of the second intermediate layer 17 was increased to 0.6 nm or more.

Further, S/Nd measured was lowered for the specimen No. 401 where the second intermediate layer 17 was not formed, or the specimen No. 402 where the second intermediate layer was formed to 0.3 nm thickness compared with the magnetic recording medium where the second intermediate layer 17 was formed to a thickness of 0.6 nm or more.

From the results, it was found that the thickness of Ru formed as the second intermediate layer is preferably within a range from 0.6 nm to 1 nm in order to satisfy both reduction of the thermal demagnetization and improvement of the overwriting characteristics, as well as high S/Nd simultaneously.

TABLE 4

| Specimen No. | Second intermediate layer(nm) | Brt (Tnm) | O/W (dB) | S/Nd (dB) | Output reduction rate |
|---|---|---|---|---|---|
| 401 | 0 | 8.3 | −31 | 22.3 | — |
| 402 | 0.3 | 8.1 | −31 | 23.0 | — |
| 403 | 0.4 | 7.9 | −30 | 23.9 | −2.4% digit |
| 404 | 0.5 | 8.0 | −30 | 24.7 | −2.2% digit |
| 104 | 0.6 | 7.8 | −31 | 24.6 | −1.4% digit |
| 405 | 0.8 | 7.8 | −29 | 24.3 | −1.4% digit |
| 405 | 1.0 | 7.9 | −28 | 24.3 | −1.5% digit |

EXAMPLE 6

By using an Ni-25 at % Ta alloy, an Ni-50 at % Ta alloy and a Co-30 at % Cr-10 at % Zr instead of the Ni-35 at % Ta alloy as the first underlayer 11, the alloy layers each of 30 nm thickness were formed. A layer comprising Ta of 1 nm, 4 nm and 8 nm as a main ingredient was formed thereon as the second underlayer. After exposing such that an Ar gas with addition of 1% oxygen was at 0.27 Pa for 5 sec while heating such that the temperature of the substrate was at about 300° C. by lamp heaters, a Cr-15 at % Ti-5 at % B alloy of 10 nm thickness was formed as the third underlayer 13. Magnetic recording media were formed in the same as in Example 1 except for using a Co-16 at % Cr-14 at % Pt-9 at % B alloy for the second magnetic layer and the third magnetic layer.

The magnetic recording media were combined with a composite type head having a recording electromagnetic induction type magnetic head and a reading spin valve magnetic head together and evaluated for electromagnetic conversion characteristics by a spin stand. For the evaluation, a head of the same specification as described in Example 1 was used.

As a result, in each of the magnetic recording media, S/Nd could be improved by 24.5 dB or more and the overwriting characteristics (O/W) could also be improved by −28 dB or more and there was no problem with thermal demagnetization. When comparing the thickness of the layer comprising Ta as the main ingredient for the second underlayer 12 at three levels of 2 nm, 4 nm, 8 nm, the overwriting characteristics (O/W) tended to be lowered as the film thickness increased. The trend did not dependent on the material for the first underlayer 11.

Specimens in which only the first underlayer was formed and the second underlayer and the succeeding layers were not formed were also prepared and X-ray diffraction curves using copper characteristic X-rays was measured for the first underlayer. As a result, it was confirmed that no distinct diffraction peak was exhibited other than hallow pattern in a case of using each of the alloys. As a result of measuring the X-ray diffraction curve for the specimen formed up to the protection layer, it was confirmed that no distinct diffraction peak was exhibited other than the diffraction peaks attributable to the third underlayer, the second magnetic layer, and the third magnetic layer.

EXAMPLE 7

Magnetic recording media were formed in the same manner as in Example 1 except for using a Co-14 at % Cr, Co-14 at % Cr-10 at % Pt, Co-19 at % Cr-8 at % Pt alloys instead of the magnetic layer 14 comprising the Co-14 at % Cr-6 at % Pt alloy of 3 nm thickness as the first magnetic layer, and evaluated for electromagnetic conversion characteristics. The film thickness was changed while setting the film thickness ratio between the second magnetic layer and the third magnetic layer to 1:1 so that Brt=8 Tnm.

When only the composition for the first magnetic layer was changed while setting the thickness of the first magnetic layer to 3 nm, overwriting characteristics were improved in a case of using the Co-19 at % Cr-8 at % Pt for the first magnetic layer as shown in Table 5.

TABLE 5

| Specimen No. | First intermediate layer | O/W (dB) | S/Nd (dB) | Output reduction rate |
|---|---|---|---|---|
| 501 | Co-14at. % Cr | −29 | 24.4 | −1.3% digit |
| 502 | Co-14at. % Cr-10at. % Pt | −30 | 24.8 | −1.4% digit |
| 503 | Co-19at. % Cr-8at. % Pt | −32 | 25.0 | −1.5% digit |

EXAMPLE 8

After simultaneously alkali-cleaning and drying an alumino silicate glass substrate 10 whose surface was chemically strengthened and subjected to texturing at about 40 grooves per 1 μm and an alumino silicate glass substrate 10 whose surface was chemically strengthened and not subjected to texturing, an Ni-35 at % Ta alloy of 30 nm thickness as a first underlayer 11 and a layer of 2 nm thickness comprising Ta as a main ingredient as a second underlayer 12 were formed at room temperature. After heating by lamp heaters such that the temperature of the substrate was about at 300° C., a Cr-10 at % Ti-5 at % B alloy of 10 nm thickness was formed as the third underlayer 13. Further, after forming a lower magnetic layer 14 comprising Co-16 at % Cr-6 at % Pt alloy of 3 nm thickness, the thickness of the first intermediate layer 15 comprising Ru was changed to 0.2 nm, 0.3 nm, 0.5 nm, 0.6 nm, 0.7 nm, 0.9 nm and 1.2 nm, a second magnetic layer 16 comprising a Co-16 at % Cr-14 at % Pt-8 at % B alloy, a second intermediate layer 17 of 6 nm thickness comprising Ru, and a third magnetic layer 18 comprising a Co-16 at % Cr-14 at % Pt-8 at % B alloy were successively formed, and a carbon film 19 of 3 nm thickness was formed as a protection layer. The film thickness was made identical between the second magnetic layer 16 and the third magnetic layer 18. After forming the carbon film, a lubricant comprising a perfluoroalkyl polyether as a main ingredient was coated to form a lubrication layer 20 of 1.9 nm thickness. The multi-layered film was formed by using a sheet type sputtering apparatus manufactured by Intevac Co. (MDP 250B). The base vacuum degree was 1.0 to $1.1 \times 10^{-5}$ Pa and the tact time was 6 sec in the sputtering apparatus. Sputtering was conducted for layers from the underlayer to the third magnetic layer in an Ar gas atmosphere at 0.93 Pa, and the carbon protection film was formed in a mixed gas atmosphere comprising Ar with addition of 10% nitrogen.

The thickness of the first intermediate layer 15 comprising Ru was defined as 0.6 nm, and the film thickness of the second magnetic layer and the third magnetic layer was determined such that Brt for the entire stacked films was 8 Tnm. As a result of fixing the film thickness of the second magnetic layer and the third magnetic layer and varying the thickness of the first intermediate layer 15, Brt of the entire stacked films increased to more than 8 Tnm and the overwriting characteristics and S/Nd were deteriorated in a case of changing the thickness of the first intermediate layer 15 to 0.2 nm.

The value for the ratio of the coercive force Hc (C) measured in the circumferential direction of the disk to the coercive force Hc (R) measured in the radial direction of the disk (Hc(C)/Hc(R)) was about 1.07 on the textured substrate and it did not depend on the thickness of the first intermediate layer. On the other hand, the value for Hc(C)/Hc(R)) was 1.00 on a usual substrate not subjected to texturing and the coercive force was isometric within the plane of the substrate. The output resolution power was improved by using the substrate subjected to texturing when (Hc(C)/Hc (R)) increases to more than 1.

As a result of observing the shape of the texture under an intermittent contact type interatomic force microscope, the surface roughness Ra was 0.4 nm to 0.5 nm in the radial direction.

EXAMPLE 9

Instead of forming the Cr-15 at % Ti-5 at % B alloy of 10 nm thickness as the third underlayer 13, a Cr-40 at % Mo alloy underlayer was formed after forming a Cr-20 at % Ti alloy underlayer film. Subsequently, magnetic recording media were formed in the same manner as in Example 1 except for forming a first magnetic layer 14 comprising a Co-14 at % Cr-6 at % Pt-4 at % B alloy of 3 nm thickness. Also in a case of using B-containing alloy for the first magnetic layer, a magnetic recording medium oriented in-plane could be formed.

EXAMPLE 10

An Ni-40 at % Ta alloy of 30 nm thickness as the first underlayer 18 and a Ta layer of 2 nm thickness as the second underlayer 12 were formed at a room temperature. After heating by lamp heaters such that the temperature of the substrate reached about 300° C., a CR-15 at % Ti-5 at % B alloy layer was formed as the third underlayer 13. Further, after forming a Co-19 at % Cr-8 at % Pt alloy layer as the first magnetic layer 14, forming a first intermediate layer 15 of 0.5 nm thickness comprising Ru, and forming up to the second magnetic layer 16 shown in Table 6, a carbon film of 3.2 nm thickness was formed directly as the protection layer 19 without forming the second intermediate layer 17 and the third magnetic layer 18. For the stacked films described above, a thickness tx of the second magnetic layer 16 to provide 4.5 Tnm of Brt was determined previously. The following media were formed by using this thickness tx.

After forming an Ni-40 at % Ta alloy layer of 30 nm thickness as the first underlayer 11, and a Ta layer of 2 nm thickness as the second underlayer 12 at room temperature and heating by a lamp heater such that the temperature of substrate was at about 300° C., a Cr-15 at % Ti-5 at % B alloy layer of 5 nm thickness was formed as the third underlayer 13. Further, after forming a Co-19 at % Cr-8 at % Pt alloy layer of 3 nm thickness as the first magnetic layer 14 and forming the first intermediate layer of 0.5 nm thickness comprising Ru, the second magnetic layer 16 shown in Table 6, the second intermediate layer 17 of 0.8 nm thickness comprising Ru, and the third magnetic layer 18 shown in Table 6 were formed such that the Brt of the stacked films was 9 Tnm.

TABLE 6

| Specimen No. | Second magnetic layer | Third magnetic layer | O/W (dB) | S/Nd (dB) | Output reduction rate |
| --- | --- | --- | --- | --- | --- |
| 601 | Co-18at. % Cr-13at. % Pt-8at. % B | Co-18at. % Cr-14at. % Pt-8at. % B | −30 | 24.3 | −1.4% digit |
| 602 | Co-18at. % Cr-13at. % Pt-8at. % B | Co-16at. % Cr-14at. % Pt-8at. % B | −30 | 24.3 | −1.2% digit |
| 603 | Co-18at. % Cr-12at. % Pt-8at. % B | Co-16at. % Cr-14at. % Pt-8at. % B | −34 | 24.9 | −1.1% digit |
| 604 | Co-16at. % Cr-14at. % Pt-8at. % B | Co-16at. % Cr-14at. % Pt-8at. % B | −29 | 22.7 | −1.1% digit |
| 605 | Co-16at. % Cr-12at. % Pt-8at. % B | Co-16at. % Cr-14at. % Pt-8at. % B | −30 | 23.8 | −1.3% digit |

A carbon film of 3 nm thickness was formed as the protection layer 19. After forming the carbon film, a lubricant comprising a perfluoroalkyl polyether as a main ingredient was coated to form a lubrication layer 20 of 1.8 nm thickness. The multi-layered films were formed by using a sheet type sputtering apparatus (MDP250B) manufactured by Intevac Corp. The period that they are left in each of the discharging chambers was set to 6 sec. From the first underlayer up to the upper magnetic layer were formed in an Ar gas atmosphere at 0.93 Pa, and the carbon protection film was formed in a gas mixture atmosphere with addition of 10% nitrogen to Ar.

The Pt composition and the electromagnetic conversion characteristics are compared between the third magnetic layer and the second magnetic layer shown in Table 6. Based on the comparison for the magnetic recording media between specimen Nos. 602 and 603, overwriting characteristics were improved by 4 dB and S/Nd was also improved by 0.6 dB when the concentration of Pt contained in the second magnetic layer was reduced from 13% to 12%. Based on the comparison for the magnetic recording media between specimen Nos. 604 and 605, overwriting characteristics were improved by 1 dB and S/Nd was also improved by 1.1 dB when the concentration of Pt contained in the second magnetic layer was reduced from 14% to 12%. Based on the comparison for the magnetic recording media between specimen Nos. 605 and 603, overwriting characteristics were improved by 4 dB and S/Nd was also improved by 1.1 dB when the concentration of Cr contained in the second magnetic layer was increased from 16% to 18% for replacement with Co.

From the results described above, it has been found that the overwriting characteristics can be improved and S/Nd can be increased by lowering the concentration of Pt contained in the second magnetic layer to less than the concentration of Pt contained in the third magnetic layer. Further, it has been found that when the concentration of Cr contained in the second magnetic layer is increased to more than the concentration of Cr contained in the third magnetic layer, overwriting characteristics can be improved and S/Nd can be increased.

COMPARATIVE EXAMPLE 2

An Ni-40 at % Ta alloy of 30 nm thickness as the first underlayer 11 and a Ta layer of 2 nm thickness as the second underlayer 12 were formed at room temperature. After heating by lamp heaters such that the temperature of the substrate was about at 300° C., a Cr-15 at % Ti-5 at % B alloy layer of 5 nm thickness was formed as the third underlayer 13. Further, after forming a Co-19 at % Cr-8 at % Pt alloy layer was formed to 3 nm thickness as the first magnetic layer 14 and forming up to the first intermediate layer 15 of 0.5 nm thickness comprising Ru and the second magnetic layer 16 shown in Table 6, a carbon film of 3.2 nm thickness was directly formed as a protection layer 19 without forming the second intermediate layer 17 and the third magnetic layer 18. Brt was controlled to 9 Tnm for the stacked films. The electromagnetic conversion characteristics of the magnetic recording media in Comparative Example 2 were evaluated by the same head as the magnetic head used for the evaluation in Example 10. As a result, in the magnetic recording medium of Comparative Example 2, S/Nd was lowered from 1.6 dB to 0.4 dB compared with the media of Example 10 having the constitution shown in Table 6 and Brt of 9 Tnm.

That is, when a comparison is made on a basis of the same Brt, S/Nd can be improved by forming the first intermediate layer 15 and then forming the second magnetic layer 16 shown in Table 6, the second intermediate layer 17 and the third magnetic layer 18 shown in Table 6, compared with the case of forming only the second magnetic layer shown in Table 6 after forming the first intermediate layer 15.

EXAMPLE 11

The following magnetic recording medium was formed by using the same sputtering apparatus as in Example 1. At first, after alkali-cleaning and drying an alumino silicate glass substrate 10 whose surface was chemically strengthened and subjected to texturing with about 40 grooves per 1 μm, an Ni-35 at % Ta alloy of 28 nm thickness as the underlayer 11 and a layer of 2 nm thickness comprising Ta as the main ingredient as a second underlayer 12 were formed at room temperature. After heating by lamp heaters such that the temperature of the substrate was at about 300° C. and exposing the same in an oxygen-containing atmosphere for 4 sec, a Cr-10 at % Ti-3 at % B alloy of 11 nm to 12 nm thickness was formed as the third underlayer 13. Further, after forming a lower magnetic layer 14 of 3.5 nm thickness comprising a Co-16 at % Cr-9 at % Pt alloy, the thickness of the first intermediate layer 15 comprising Ru was fixed to 0.5 nm, a second magnetic layer 16 comprising a Co-16 at % Cr-12 at % Pt-8 at % B alloy was formed to 11 nm, an intermediate layer 17 of 0.6 nm thickness comprising Ru, and a third magnetic layer 18 of 12 nm thickness comprising a Co-16 at % Cr-14 at % Pt-8 at % B alloy were formed successively, and a carbon film 19 of 3 nm thickness was formed as a protection layer.

The magnetic recording medium was evaluated for electromagnetic conversion characteristics by use of the magnetic head described in Example 1. As a result, the overwriting characteristics were O/Wn'n=−31 dB, and S/Nd was also as 24.1 dB favorably. Further, the output reduction rate at 65° C. was −1.4% per time digit and there was no problem in view of reliability.

EXAMPLE 12

A magnetic recording medium was formed in the same manner as in Example 11 except for forming a magnetic recording medium by using a Co-18 at % Cr-12 at % Pt-8 at % B alloy target as the second magnetic layer 16. The thickness of the second magnetic layer 16 was controlled so as to obtain solitary reading wave outputs identical with those in Example 11.

The magnetic recording medium was evaluated for electromagnetic conversion characteristics by use of the magnetic head described in Example 1. As a result, overwriting characteristics were: O/Wn'n=−34 dB, and S/Nd was also favorably as 24.7 dB. Further, the output reduction rate at 65° C. was −1.5% per time digit and a high performance magnetic recording medium with no problem in view of reliability could be attained.

As has been described above, the present invention can provide longitudinal magnetic recording medium having high S/Nd, excellent overwriting characteristics and stability sufficient to thermal fluctuation.

What is claimed is:
1. A magnetic recording medium, comprising:
an underlayer, a first magnetic layer, a first intermediate layer, a second magnetic layer, a second intermediate layer, a third magnetic layer, a protection layer and a lubrication layer, which are formed above a substrate; and
each of the third magnetic layer and the second magnetic layer comprises a cobalt-based alloy containing at least platinum and chromium, a concentration of platinum contained in the second magnetic layer is not more than that in the third magnetic layer, platinum contained in the third magnetic layer is 15 at % or less, a concentration of chromium contained in the third magnetic layer is 15 at % or more and 18 at % or less, and a concentration of boron contained in the third magnetic layer is 7 at % or more and 10 at % or less.

2. The magnetic recording medium of claim 1, wherein the first intermediate layer comprises ruthenium as a main ingredient.

3. The magnetic recording medium of claim 2, wherein the second intermediate layer comprises ruthenium as a main ingredient and a thickness thereof is in a range of 0.6 nm to 1.0 nm.

4. The magnetic recording medium of claim 1, wherein the underlayer comprises a cobalt alloy layer containing chromium and zirconium, a layer comprising tantalum as a main ingredient and a chromium alloy layer containing titanium and boron, which are stacked in this order.

5. The magnetic recording medium of claim 1, wherein the underlayer comprises a nickel alloy layer containing tantalum, a layer comprising a tantalum as a main ingredient, a chromium alloy layer containing titanium and a chromium alloy layer containing molybdenum, which are stacked in this order.

6. The magnetic recording medium of claim 1, wherein the substrate has a texture provided with a plurality of circumferential grooves formed in a radial direction.

7. The magnetic recording medium of claim 1, wherein a concentration of platinum contained in the second magnetic layer is less than that in the third magnetic layer, and a concentration of chromium contained in the second magnetic layer is more than a concentration of chromium contained in the third magnetic layer.

8. The magnetic recording medium of claim 1, wherein the first magnetic layer comprises a cobalt-based alloy containing chromium or a cobalt-based alloy containing chromium and platinum.

9. A magnetic recording medium, comprising:
an underlayer, a first magnetic layer, a first intermediate layer, a second magnetic layer, a second intermediate layer, a third magnetic layer, a protection layer, and a lubrication layer, which are formed in this order on a substrate; and
the underlayer comprises a nickel base alloy containing tantalum, a layer comprising tantalum as a main ingredient and a chromium alloy layer containing titanium and boron stacked in this order, each of the third magnetic layer and the second magnetic layer comprises a cobalt-based alloy containing at least platinum, chromium and boron, a concentration of platinum contained in the second magnetic layer is not more than that in the third magnetic layer, platinum contained in the third magnetic layer is 15 at % or less, a concentration of chromium contained in the third magnetic layer is 15 at % or more and 18 at % or less, and a concentration of boron contained in the third magnetic layer is 7 at % or more and 10 at % or less.

10. The magnetic recording medium of claim 9, wherein the first intermediate layer comprises ruthenium as a main ingredient.

11. The magnetic recording medium of claim 10, wherein the second intermediate layer comprises ruthenium as a main ingredient and a thickness thereof is in a range of 0.6 nm to 1.0 nm.

12. The magnetic recording medium of claim 9, wherein the substrate has a texture provided with a plurality of circumferential grooves in a radial direction.

13. The magnetic recording medium of claim 9, wherein the concentration of platinum contained in the second magnetic layer is less than the concentration of platinum contained in the third magnetic layer, and the concentration of chromium contained in the second magnetic layer is more than the concentration of chromium contained in the third magnetic layer.

14. The magnetic recording medium of claim 9, wherein the first magnetic layer comprises a cobalt-based alloy containing chromium or a cobalt-based alloy containing chromium and platinum.

15. A magnetic recording medium, comprising:
an underlayer, a first magnetic layer, a first intermediate layer, a second magnetic layer, a second intermediate layer, a third magnetic layer, a protection layer, and a lubrication layer, which are formed in this order on a substrate;
the underlayer comprises a nickel-based alloy containing tantalum, a layer comprising tantalum and a chromium alloy layer containing titanium and boron stacked in this order, each of the third magnetic layer and the second magnetic layer comprises a cobalt-based alloy containing at least platinum, chromium, and boron, a concentration of platinum contained in the second magnetic layer is less than that in the third magnetic layer, platinum contained in the third magnetic layer is 15 at % or less, a concentration of chromium contained in the third magnetic layer is in a range of 15 to 18 at %, a concentration of chromium contained in the second magnetic layer is more than the concentration of chromium contained in the third magnetic layer, and a concentration of boron contained in the third magnetic layer is in a range of 7 to 10 at %; wherein
both the first and second intermediate layers comprise ruthenium, and a thickness of the second intermediate layer is in a range of 0.6 nm to 1.0 nm; and wherein
the first magnetic layer comprises a cobalt-based alloy containing chromium or a cobalt-based alloy containing chromium and platinum.

* * * * *